(12) United States Patent
Shinoda

(10) Patent No.: US 8,627,045 B2
(45) Date of Patent: Jan. 7, 2014

(54) POSTPONING PROCESSING OF RECEIVED COMMANDS OF PRE-DETERMINED TYPE UNTIL AMOUNT OF ASSOCIATED DATA RECEIVED AND AGGREGATED EXCEEDS THRESHOLD TO SAVE POWER

(75) Inventor: Kazumoto Shinoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 665 days.

(21) Appl. No.: 12/875,714

(22) Filed: Sep. 3, 2010

(65) Prior Publication Data

US 2011/0179257 A1 Jul. 21, 2011

(30) Foreign Application Priority Data

Jan. 19, 2010 (JP) ................................. 2010-009105

(51) Int. Cl.
*G06F 15/00* (2006.01)
*G06F 1/32* (2006.01)

(52) U.S. Cl.
USPC .............................. 712/220; 712/28; 713/320

(58) Field of Classification Search
None
See application file for complete search history.

(56) References Cited

U.S. PATENT DOCUMENTS 5,581,668 A * 12/1996 Oida et al. .................... 358/1.14
8,269,998 B2 * 9/2012 Eto .............................. 358/1.14

FOREIGN PATENT DOCUMENTS

JP 2004-272596 A 9/2004

* cited by examiner

*Primary Examiner* — Kenneth Kim
(74) *Attorney, Agent, or Firm* — Sughrue Mion, PLLC

(57) ABSTRACT

A data processing device including a reception unit, an instruction unit and a storage unit. The reception unit receives instructions for processing at a processing execution device. The instruction unit instructs the processing execution device to cancel a power saving state of the processing execution device and execute the processing corresponding to an instruction received by the reception unit. The storage unit stores data relating to received instructions. If the processing corresponding to the received instruction is a pre-specified process, data relating to the instruction is stored by the storage unit. If the processing corresponding to the received instruction is not a pre-specified process, the instruction unit instructs the processing execution device to execute both the processing corresponding to this instruction and processing based on data relating to instructions stored in the storage unit.

4 Claims, 16 Drawing Sheets

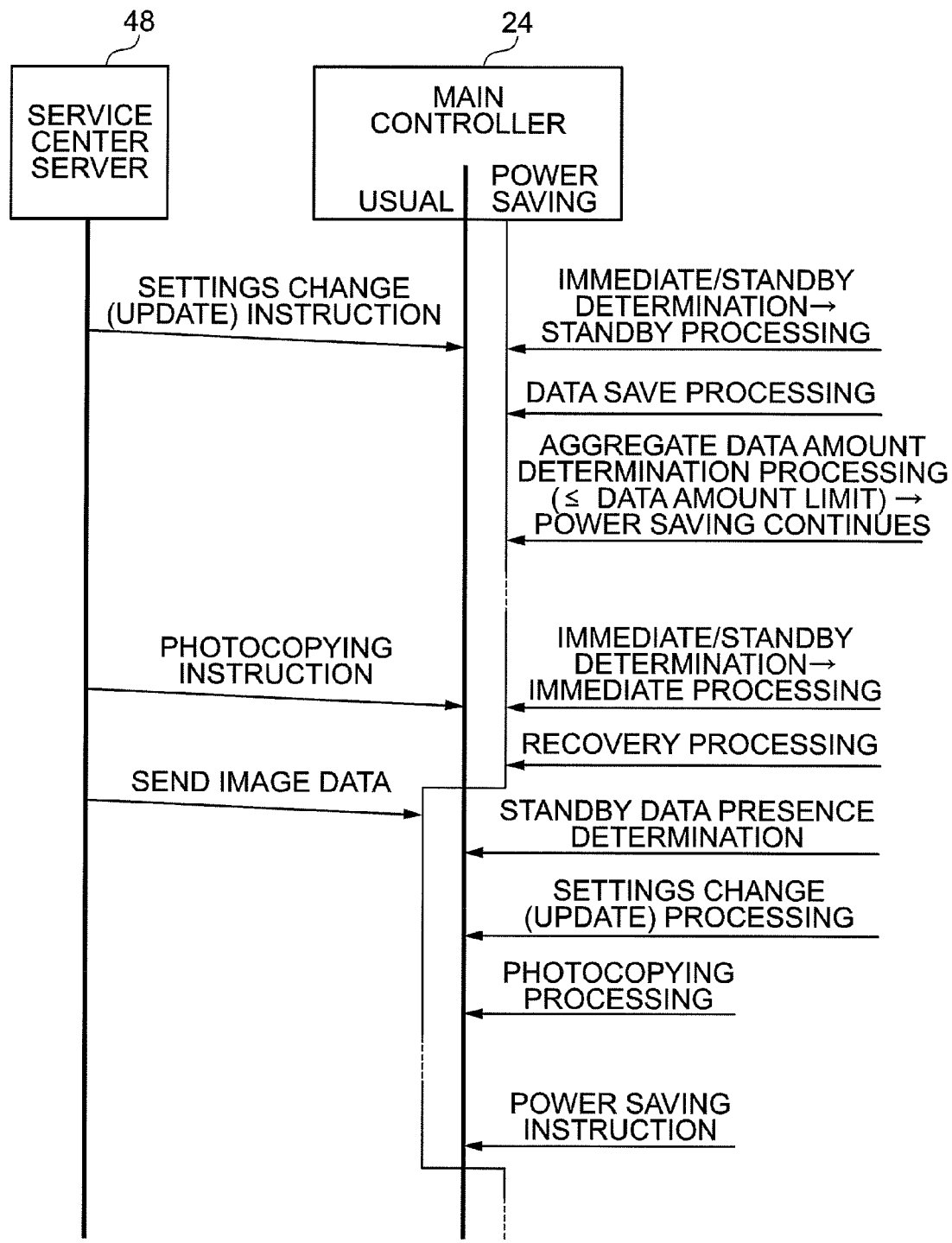

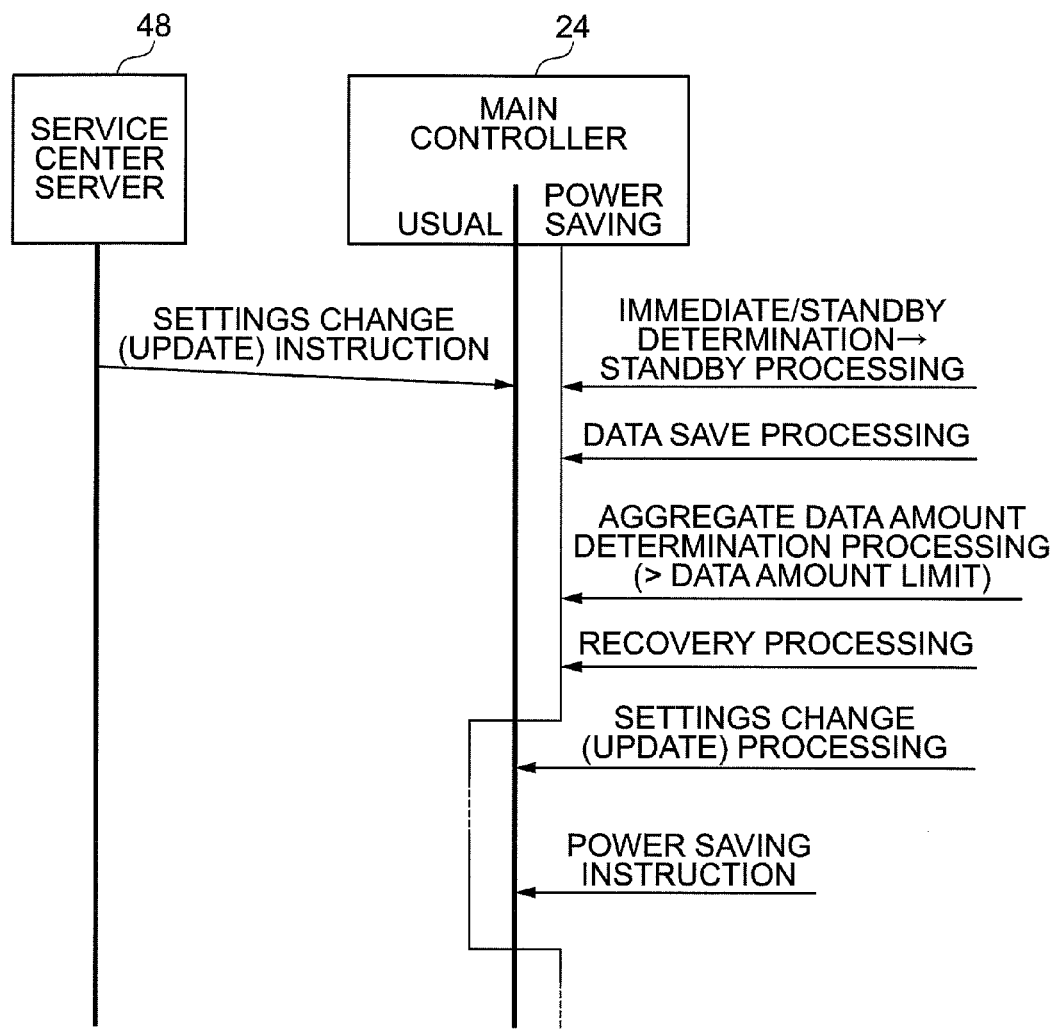

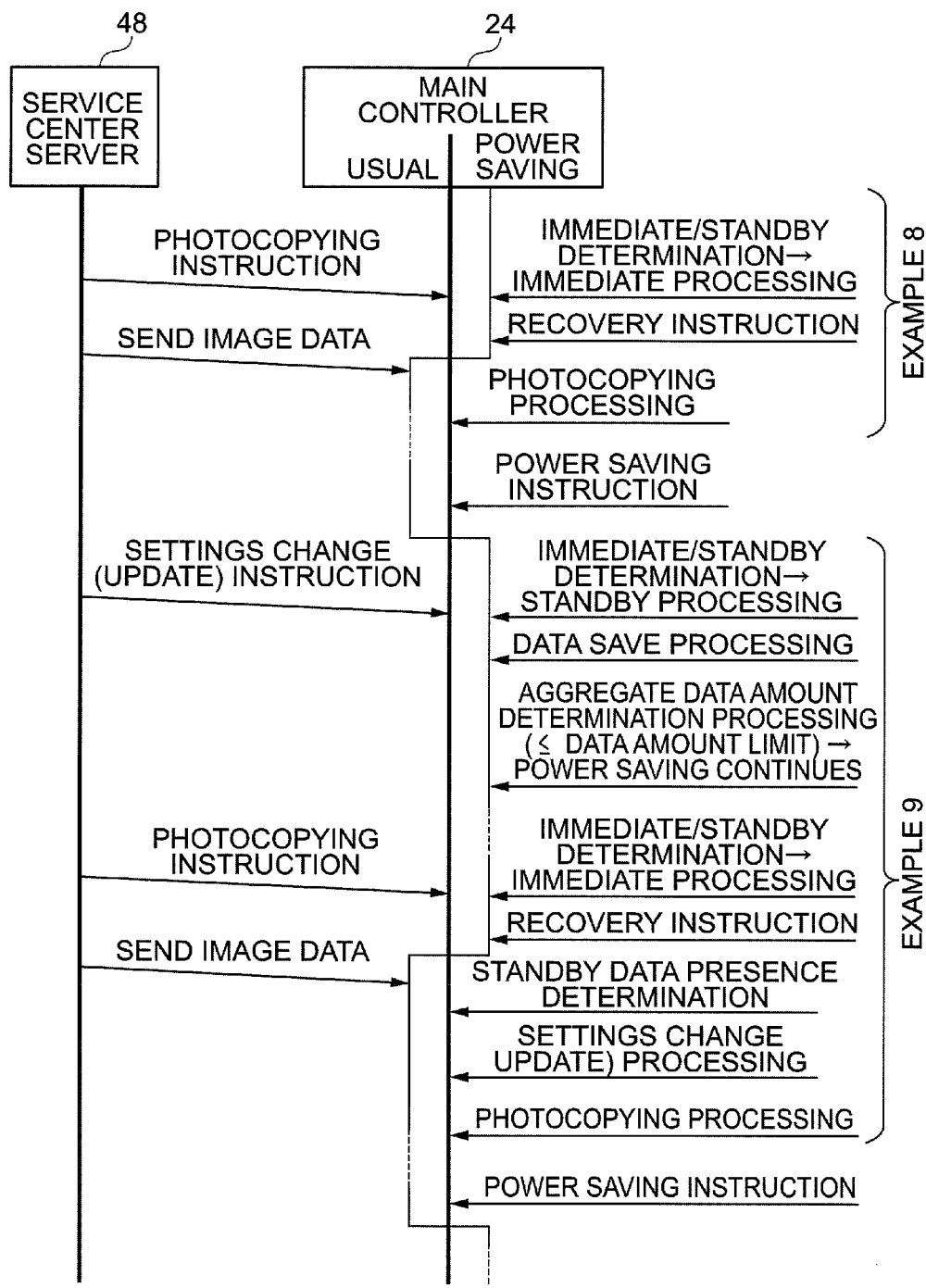

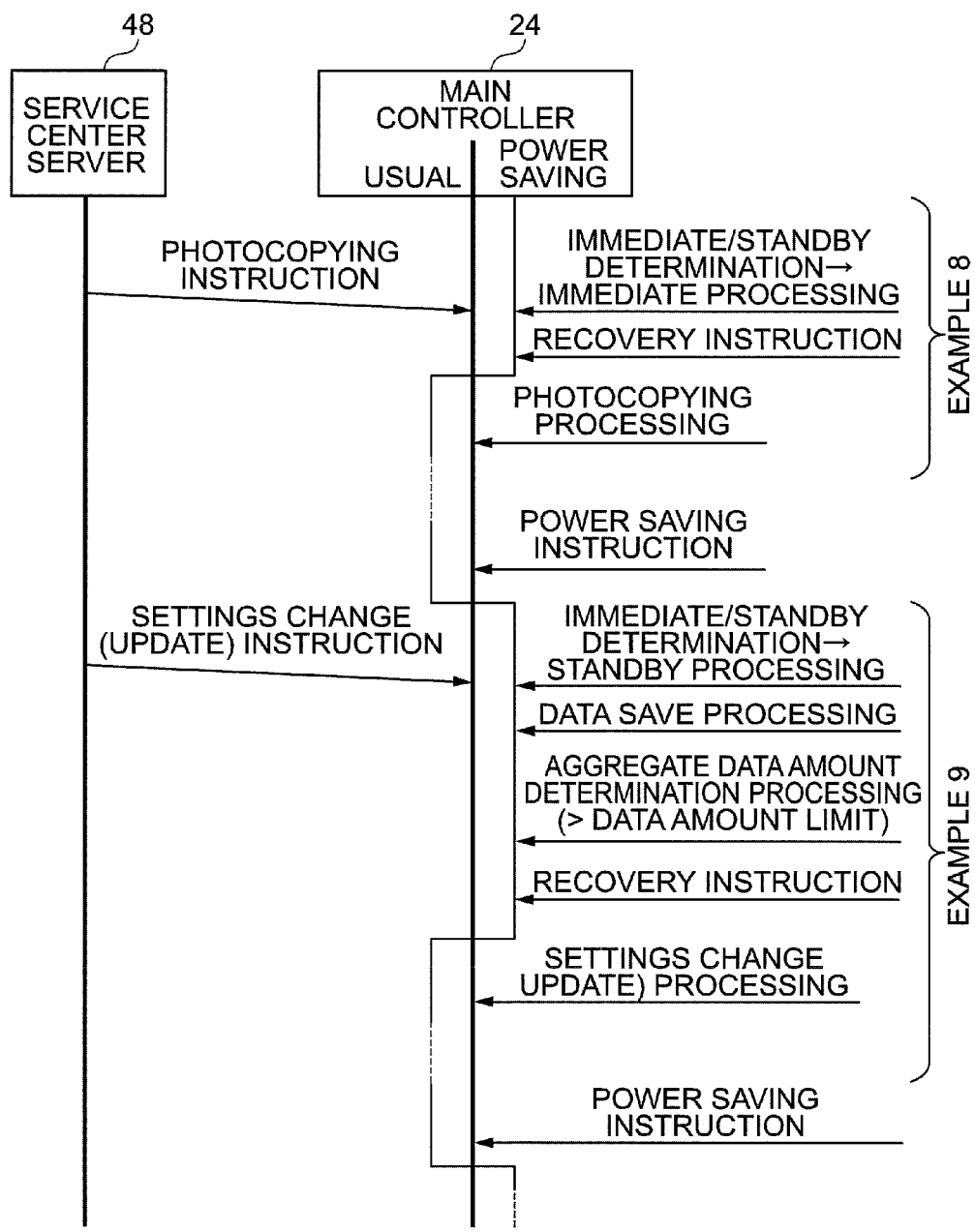

POSTPONING PROCESSING OF RECEIVED COMMANDS OF PRE-DETERMINED TYPE UNTIL AMOUNT OF ASSOCIATED DATA RECEIVED AND AGGREGATED EXCEEDS THRESHOLD TO SAVE POWER

CROSS-REFERENCE TO RELATED APPLICATION

This application is based on and claims priority under 35 USC 119 from Japanese Patent Application No. 2010-009105 filed on Jan. 19, 2010.

BACKGROUND

1. Technical Field

The present invention relates to an image forming device, an image forming method and a computer readable medium.

2. Related Art

Conventionally, there is a print system that gives a power saving recovery instruction to equipment that requires power saving recovery before transmitting print data.

SUMMARY

An image forming device relating to an aspect of the present invention is a data processing device including: a reception unit that receives instructions for processing at a processing execution device; an instruction unit that instructs the processing execution device to cancel a power saving state of the processing execution device and execute processing corresponding to an instruction received by the reception unit; and a storage unit that stores data relating to a received instruction, wherein, if the processing corresponding to the received instruction is pre-specified processing data relating to the received instruction is stored at the storage unit, and if the processing corresponding to a received instruction is not the pre-specified processing, the instruction unit instructs the processing execution device to execute the processing corresponding to this instruction and also processing based on data relating to instructions stored at the storage unit.

BRIEF DESCRIPTION OF THE DRAWINGS

An exemplary embodiment of the present invention will be described in detail based on the following figures, wherein:

FIG. 13 is processing (a ninth example) that is executed between the service center server and the main controller, which is the structure of the variant example of the present exemplary embodiment;

FIG. 14 is processing (a tenth example) that is executed between the service center server and the main controller, which is the structure of the variant example of the present exemplary embodiment;

FIG. 15 is processing (an eleventh example) that is executed between the service center server and the main controller, which is the structure of the variant example of the present exemplary embodiment; and FIG. 16 is processing (a twelfth example) that is executed between the service center server and the main controller, which is the structure of the variant example of the present exemplary embodiment.

DETAILED DESCRIPTION

Figure 1:
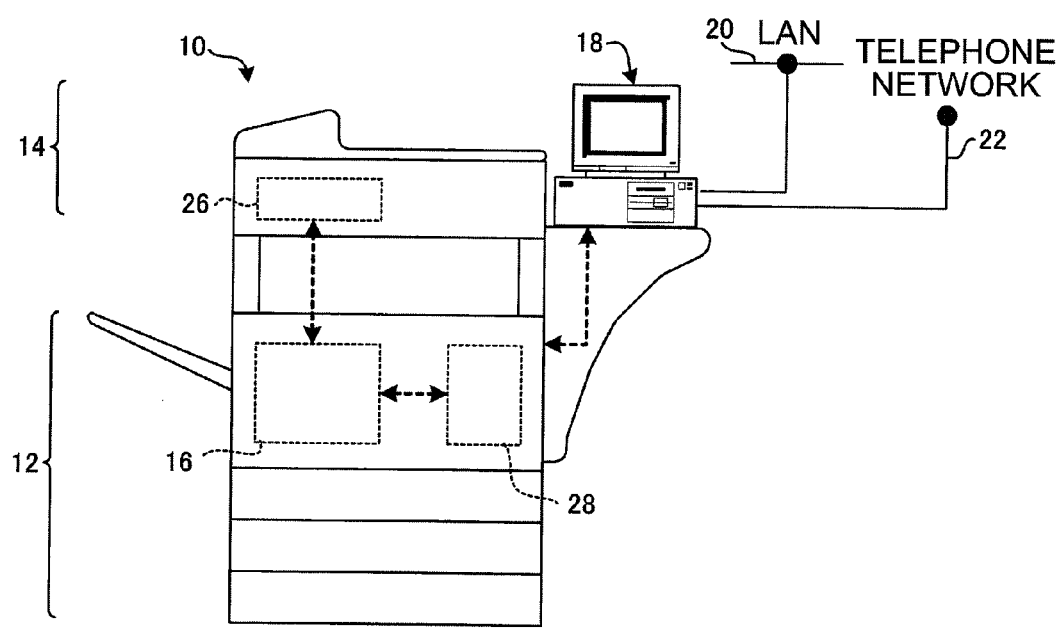
FIG. 1 is a front view showing the exterior of an image forming device relating to a present exemplary embodiment.

An image forming device 10 is illustrated in FIG. 1. The image forming device 10 includes an image formation section 12 that forms an image on recording paper and an image reading section 14 that reads an image of an original document. The original document image read by the image reading section 14 is processed by an image processing control section 16 and is sent to the image formation section 12.

A data processing terminal 18 is connected to the image processing control section 16. A network communications circuit 20, such as the Internet or the like, and a telephone network 22 are both connected to the data processing terminal 18. The data processing terminal 18 performs the function of communicating data through, for example, the network communications circuit 20 or the telephone network 22 between the image forming device 10 and an external server, a service center that performs maintenance of the image forming device 10, and the like.

The image formation section 12 includes a photoreceptor. Around the photoreceptor of the image formation section 12, a charging device, a scanning exposure section, an image developing section, a transfer section and a cleaning section are provided. The charging device uniformly charges the photoreceptor. The scanning exposure section scans a light beam in accordance with image data. The image developing section develops an electrostatic latent image that has been formed by scanning exposure being performed by the scanning exposure section. The transfer section transfers a visualized image on the photoreceptor to the recording paper. The cleaning section cleans the surface of the photoreceptor after the transfer. The image formation section 12 also includes a fixing section that fixes the image onto the recording paper after the transfer, on a conveyance path of the recording paper.

In the present exemplary embodiment, a credit processing function is installed in the data processing terminal 18. The data processing terminal 18 may send an image processing permission signal to the image forming device 10 at a time when proper credit is present.

Figure 2:
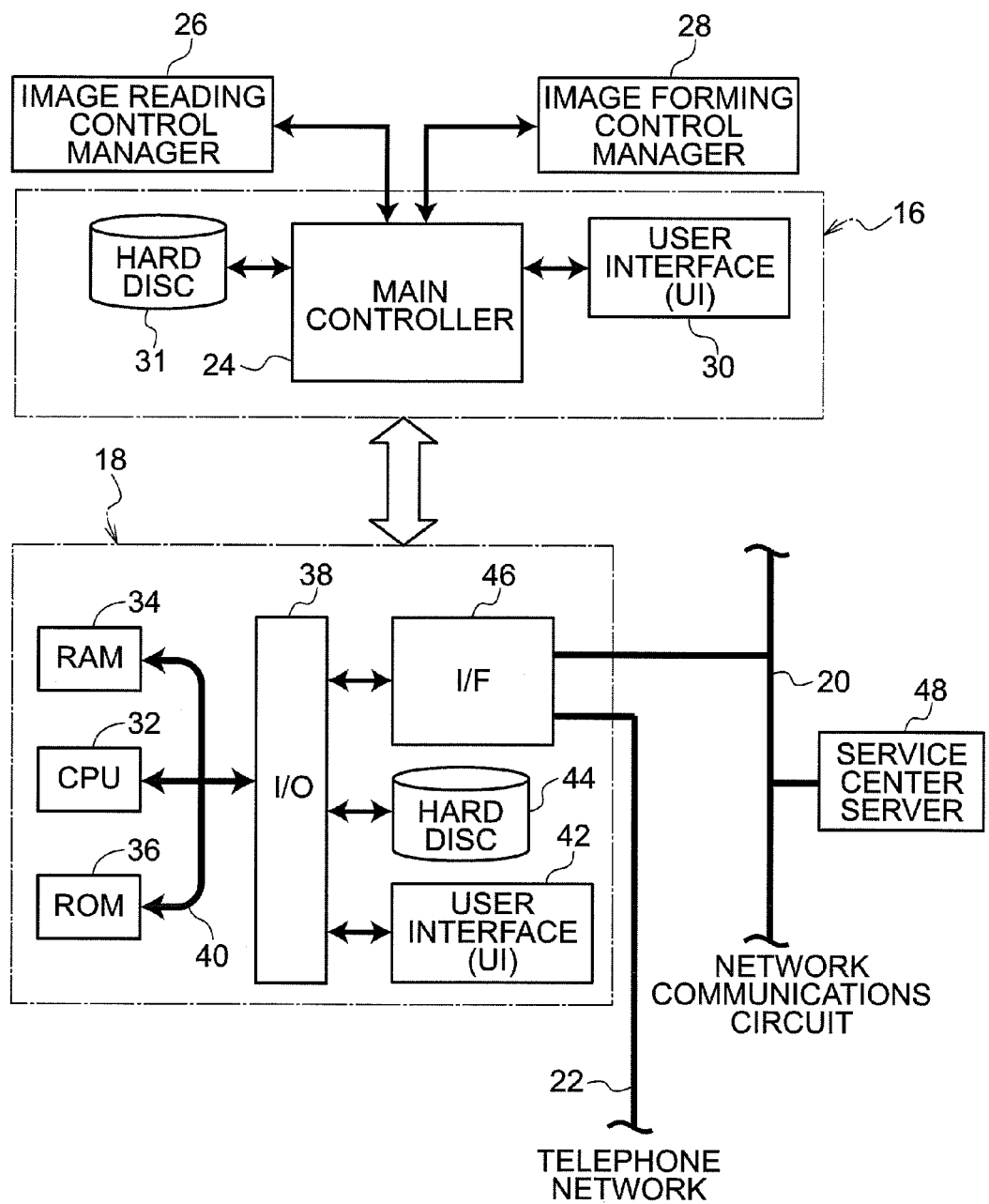
FIG. 2 is a block diagram illustrating schematics of a control system of the image forming device relating to the present exemplary embodiment.

As illustrated in FIG. 2, the image processing control section 16 includes a main controller 24. An image reading control manager 26 and an image forming control manager 28 are connected to the main controller 24.

The image reading control manager 26 is connected to, at the image reading section 14, an original document conveyance system, a scanning driving system for reading an image, an optoelectronic conversion device for reading an image or the like, and the image reading control manager 26 controls each of these.

The image forming control manager 28 is connected to, at the image formation section 12, a conveyance system, a scanning exposure system for image formation, and processing systems such as a development system and the like, and the image forming control manager 28 controls each of these.

A user interface (UI) 30 and a hard disc 31 are connected to the main controller 24.

The data processing terminal 18 is connected to the image processing control section 16. The data processing terminal 18 includes a CPU 32, a RAM 34, a ROM 36, an input/output section (I/O) 38, and a bus 40 that connects these together, such as a data bus, a control bus or the like.

A UI 42 is connected to the I/O 38. The UI 42 performs the functions of accepting instructions inputted by a user and reporting data relating to image processing to the user. A hard disc 44 is connected to the I/O 38. The I/O 38 is connected to the network communications circuit 20 and the telephone network 22 via an interface (I/F) 46.

Functions of the data processing terminal 18 are realized by the CPU 32 operating in accordance with a program recorded in the hard disc 44 or the like. This program may be installed from a recording medium on which the program is stored (a CD-ROM, a DVD-ROM or the like), and the functions of the data processing terminal 18 realized by the CPU 32 operating in accordance with the program.

Now, the image forming device 10 of the present exemplary embodiment has at least two modes (states): a usual mode and a power saving mode. The power saving mode is a mode in which electric power consumption of the image forming device is smaller than in the usual mode. At least some of the processes that may be executed in the usual mode may not be executed in the power saving mode. There are various methods for realizing the power saving mode. For example, adjusting a heater temperature required for fixing processing, by heating and pressing of the recording paper by the fixing section of the image formation section 12, may be considered. The heater temperature requires a substantial amount of electric power to maintain the temperature of the usual mode. Therefore, in the power saving mode, the temperature is lowered and power consumption is suppressed, or power is cut off completely.

Further, electric power to all equipment except equipment that receives image forming instructions from outside may be cut off. Alternatively, in order to shorten a duration for recovering (changing) from the power saving mode to the usual mode and processing a first sheet of image formation, equipment to which the power is cut off may be selected.

In the present exemplary embodiment, at the data processing terminal 18 that receives instructions for photocopying processing and the like and sends these instructions to the image forming device 10, types of instructions are categorized into at least two types: instructions for immediate processing and instructions for standby processing. It is determined (judged) whether or not to recover from the power saving mode to the usual mode (cancel the power saving mode) on the basis of the type of an instruction.

Processing relating to received instructions is categorized into immediate processing or standby processing on the basis of data held in the hard disc 44 or the like (for example, a table in which processes and types of processing—immediate processing or standby processing—have been associated with one another beforehand). Data representing whether the processing relating to an instruction is immediate processing or standby processing may be included in the instruction.

What kind of processes are immediate processing (processing that is supposed to be executed as quickly as possible after the instruction is received) is an arbitrary matter. For example, processes that require the intervention of a user during execution of the processing or after the processing may be considered.

For example, a photocopying processing instruction, for which the data processing terminal 18 accepts an instruction from a user and sends the same to the image forming device 10, is determined to be an immediate processing instruction. This is because the photocopying processing requires an intervention by the user, specifically, placing an original document on a platen glass of the image forming device 10.

On the other hand, standby processing is processing for which it is sufficient that the processing be executed, for example, just before execution of immediate processing (i.e., processing for which it is presumed that immediate execution when the instruction is received is not necessary). The following examples may be considered.

A server that administers the image forming device 10 (hereinafter referred to as a service center server 48) is connected to the aforementioned network communications circuit 20. A settings change instruction, such as a version upgrade, data rewrite or the like, may be given to the image forming device 10 from this service center server 48 via the data processing terminal 18. This settings change instruction may be received when the image forming device 10 is in the power saving mode. In the present exemplary embodiment, this settings change instruction is determined (categorized) as a standby processing instruction. This is because it is acceptable for the settings change instruction to be reflected when, for example, copying processing is being executed.

At this time, data relating to the instruction is stored. The processing (settings change) is executed in accordance with the standby processing instruction, on the basis of this stored data, after the next recovery.

The next recovery may have the following modes.

Recovery (1): When there is an immediate processing instruction

Recovery (2): When an amount of processing data of standby processing instructions (described below) exceeds a pre-specified threshold value When one of the above-mentioned recovery conditions applies, the image forming device 10 recovers from the power saving mode to the usual mode. In accordance therewith, a corresponding standby processing instruction and any standby processing instructions that have been saved (stored)

previously are executed or, in the case of recovery 1, a corresponding immediate processing instruction is executed.

Below, operations of the present exemplary embodiment are described.

Image Processing (Photocopying) Procedure

At the image reading section 14, an original document image is read, and the read original document image is sent from the image reading control manager 26 to the image processing control section 16. At the image processing control section 16, the original document image is converted to image data, and is sent to the image forming control manager 28.

At the image forming control manager 28, the image formation section 12 is controlled and image forming processing is executed on the basis of the read image data.

At the scanning exposure section, a light beam based on the image data is scanned onto the photoreceptor. An electrostatic latent image that has been formed by the scanning exposure by the scanning exposure section is developed by the image developing section.

The image on the photoreceptor that has been visualized thus is transferred to recording paper at the transfer section, and the recording paper passes through the fixing section and is ejected from an equipment casing.

Figure 3:
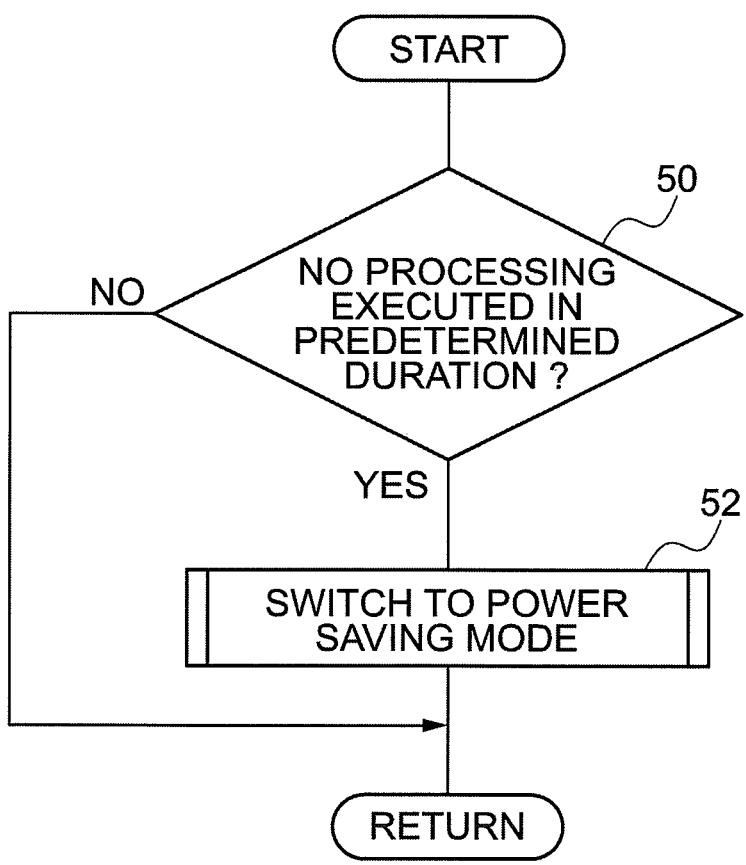
FIG. 3 is a flowchart illustrating an operation mode control routine of a main controller of an image processing control section.

One processing routine of the main controller 24 is that, as illustrated in FIG. 3, the data processing terminal 18 of the present exemplary embodiment switches to the power saving mode (step 52) if a state without image formation being executed has continued for a pre-specified period (an affirmative determination in step 50).

In this power saving mode, for example, a heater temperature required for fixing processing is not maintained at the temperature of the usual mode but the temperature is lowered and power consumption is suppressed, or the power is turned off completely.

Even when in this power saving mode, the data processing terminal 18 receives image processing photocopying instructions and settings change instructions.

Figure 4:
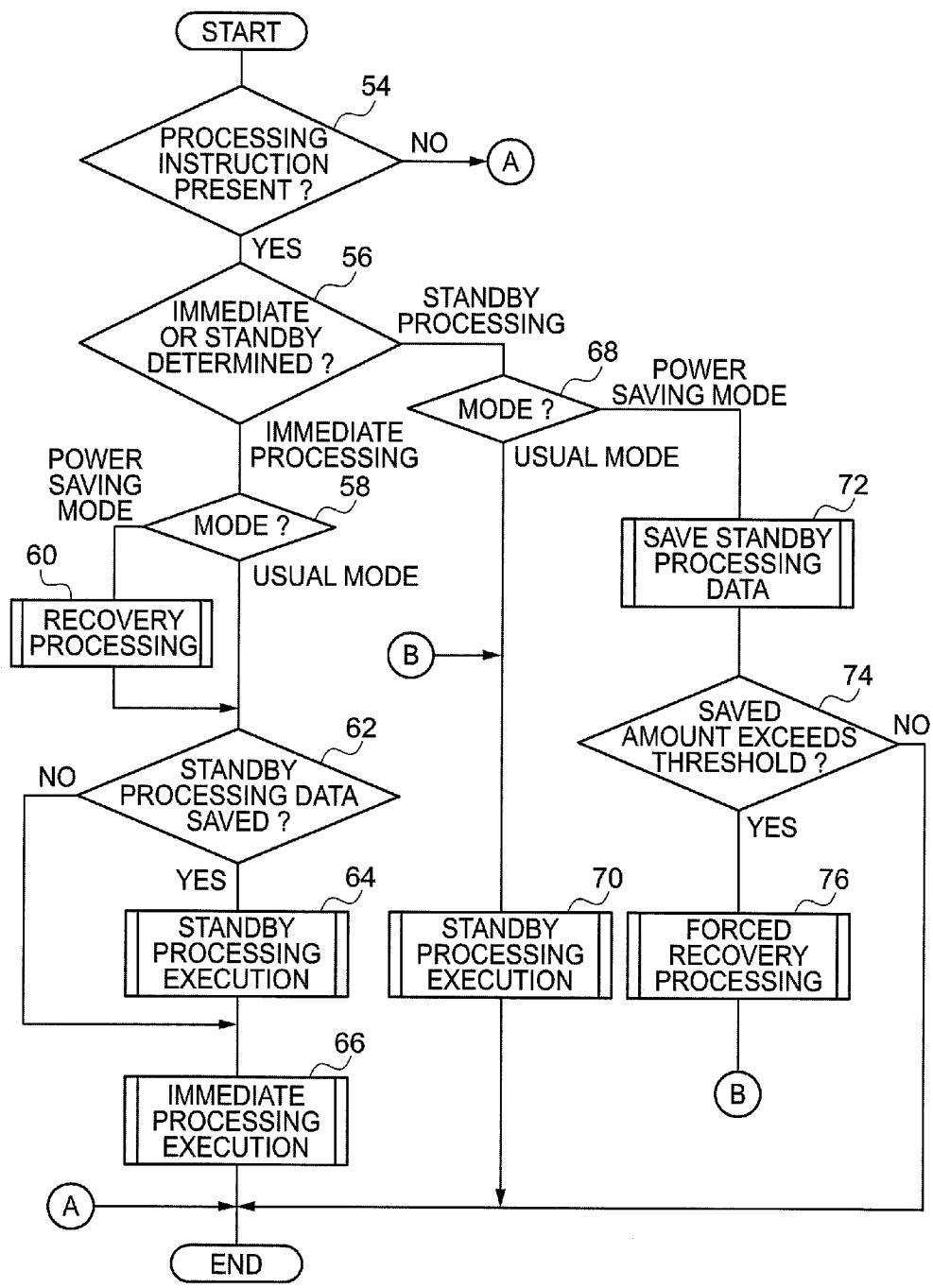
FIG. 4 is a flowchart illustrating a power saving recovery control routine of a data processing terminal relating to the present exemplary embodiment.

Herebelow, a routine at the data processing terminal 18 for mode control of the image forming device 10 is described in accordance with the flowchart of FIG. 4.

In step 54, it is judged whether or not there is a processing instruction. If the determination of step 54 is negative, the present routine ends. If the determination of step 54 is affirmative, control passes to step 56 and it is determined whether the received instruction is an immediate processing instruction or a standby processing instruction. If it is determined in step 56 that the instruction is an immediate processing instruction, control passes to step 58.

In step 58, it is judged whether the current mode of the image forming device 10 is the usual mode or the power saving mode. If the mode is determined to be the power saving mode in step 58, control passes to step 60, recovery processing is executed, the image forming device 10 is put into a state in which image reading processing and image formation processing are possible, and control passes to step 62. If it is determined in step 58 that the mode is the usual mode, the image forming device 10 is already in the state in which image reading processing and image formation processing are possible, so control passes to step 62.

In step 62, it is determined whether or not data relating to standby processing instructions (data with which the details of instructed standby processing may be ascertained) has been saved in the data processing terminal 18, having been stored while the mode was the power saving mode.

If the determination of step 62 is affirmative, control passes to step 64, standby processing corresponding to the saved data relating to standby processing instructions is executed, and control passes to step 66. If the determination of step 62 is negative, control passes to step 66.

In step 66, immediate processing is executed in accordance with the immediate processing instruction determined in step 56, and the present routine ends.

Alternatively, in step 56, if the determination of whether the received instruction is an immediate processing instruction or a standby processing instruction is that the received instruction is a standby processing instruction, control passes from step 56 to step 68.

In step 68, similarly to step 58, it is judged whether the current mode of the image forming device 10 is the usual mode or the power saving mode. If it is determined in step 68 that the mode is the usual mode, the image forming device 10 is already in the state in which image reading processing and image formation processing are possible, so control passes to step 70, the standby processing is executed, and the present routine ends.

If the mode is determined to be the power saving mode in step 68, control passes to step 72, processing to save data relating to the standby processing instruction is executed, and control passes to step 74. In step 74, a total value of time that is expected to be needed for executing standby processing corresponding to the data relating to the saved standby processing instruction(s) is calculated, and it is judged whether or not this total value exceeds a pre-specified threshold value. If this determination is negative, that is, if it is determined that the total value is not more than the threshold value, execution of the standby processing is not performed at this time and the present routine ends. If the determination of step 74 is affirmative, that is, if it is determined that the total value exceeds the threshold value, control passes to step 76, forced recovery processing is executed, and control passes to step 70. Herein, a time expected to be needed for executing standby processing is stored in advance in the data processing terminal 18 for each type of standby processing.

The threshold value is preferably a duration needed when switching the image forming device 10 from the power saving mode to the usual mode. This is because, when an immediate processing instruction is received, standby processing (processes) corresponding to data relating to the saved standby processing instruction(s) will be finished within the duration needed when switching from the power saving mode to the usual mode (here, executing the standby processing in parallel with processing to switch from the power saving mode to the usual mode). Therefore, even though the immediate processing is executed after the standby processing is executed, a user giving the immediate processing instruction will not have to wait more than necessary before executing the immediate processing.

In step 74, rather than making the determination on the basis of the time expected to be needed when executing the standby processing, the determination may be made on the basis of a number of sets of data relating to standby processing instructions that have been saved. That is, it may be determined whether or not the number of saved sets of data relating to standby processing instructions exceeds a pre-specified number.

Anyway, it is sufficient that the data used in step 74 (corresponding to the saved data relating to standby processing instructions) be data with which the time required for executing the standby processing may be roughly judged. Hereinafter, this data is referred to as a processing data amount.

Variant Example

In the present exemplary embodiment, the data processing terminal 18 is provided to serve as a relay that receives immediate processing such as a photocopying instruction or the like or standby processing such as a settings change or the like from the network communications circuit 20, and sends the same to the image forming device 10. However, this functions of the data processing terminal 18 may be performed by the main controller 24 inside the image forming device 10.

EXAMPLES

The first to sixth examples describe processing between the service center server 48, the data processing terminal 18 and the image forming device 10 (the main controller 24), which are the structure of the present exemplary embodiment.

The seventh to twelfth examples describe processing between the service center server 48 and the image forming device 10 (the main controller 24), which are the structure of the variant example of the present exemplary embodiment.

First Example

Figure 5:
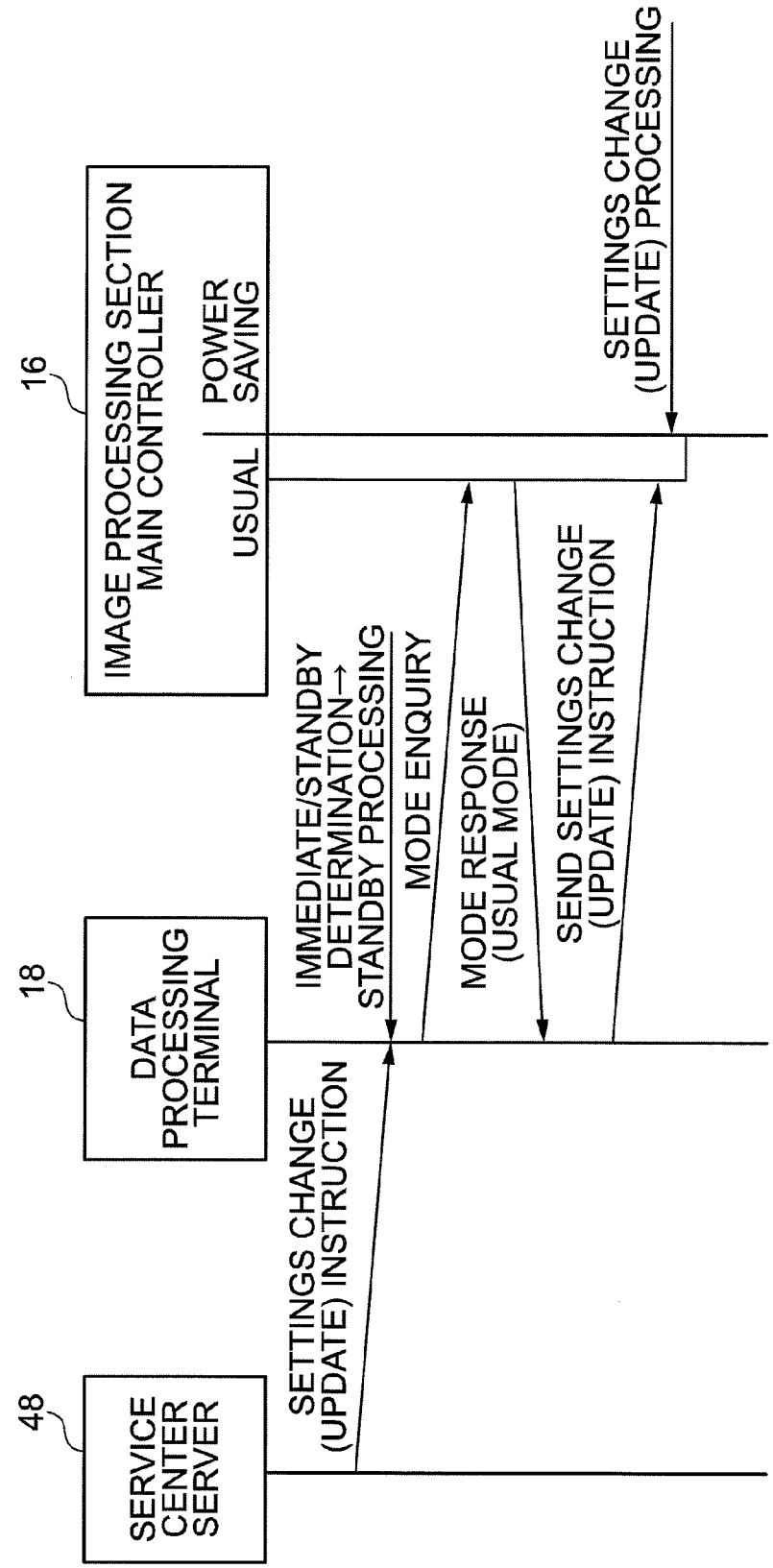
FIG. 5 is processing (a first example) that is executed between a service center server, the data processing terminal and the main controller, which is the structure of the present exemplary embodiment.

As illustrated in FIG. 5, the first example is processing when standby processing is instructed during the usual mode. The processing is described with the data processing terminal 18 being the main actor. Here, the description is given with a photocopying instruction being offered as an example of an immediate processing instruction and a settings change (update) instruction being offered as an example of a standby processing instruction.

First, the data processing terminal 18 receives a settings change (update) instruction from the service center server 48.

Then the data processing terminal 18 judges whether the received content is an immediate processing instruction or a standby processing instruction. In this case, it is judged to be a standby processing instruction, and a mode enquiry is sent to the main controller 24 of the image processing control section 16. Hence, a response from the main controller 24 is received.

In this case, the image forming device 10 is in the usual mode. Therefore, data relating to the settings change (update) instruction (settings change (update) data) is sent to the main controller 24.

Hence, the settings change (update) processing is executed at the image forming device 10.

Second Example

Figure 6:
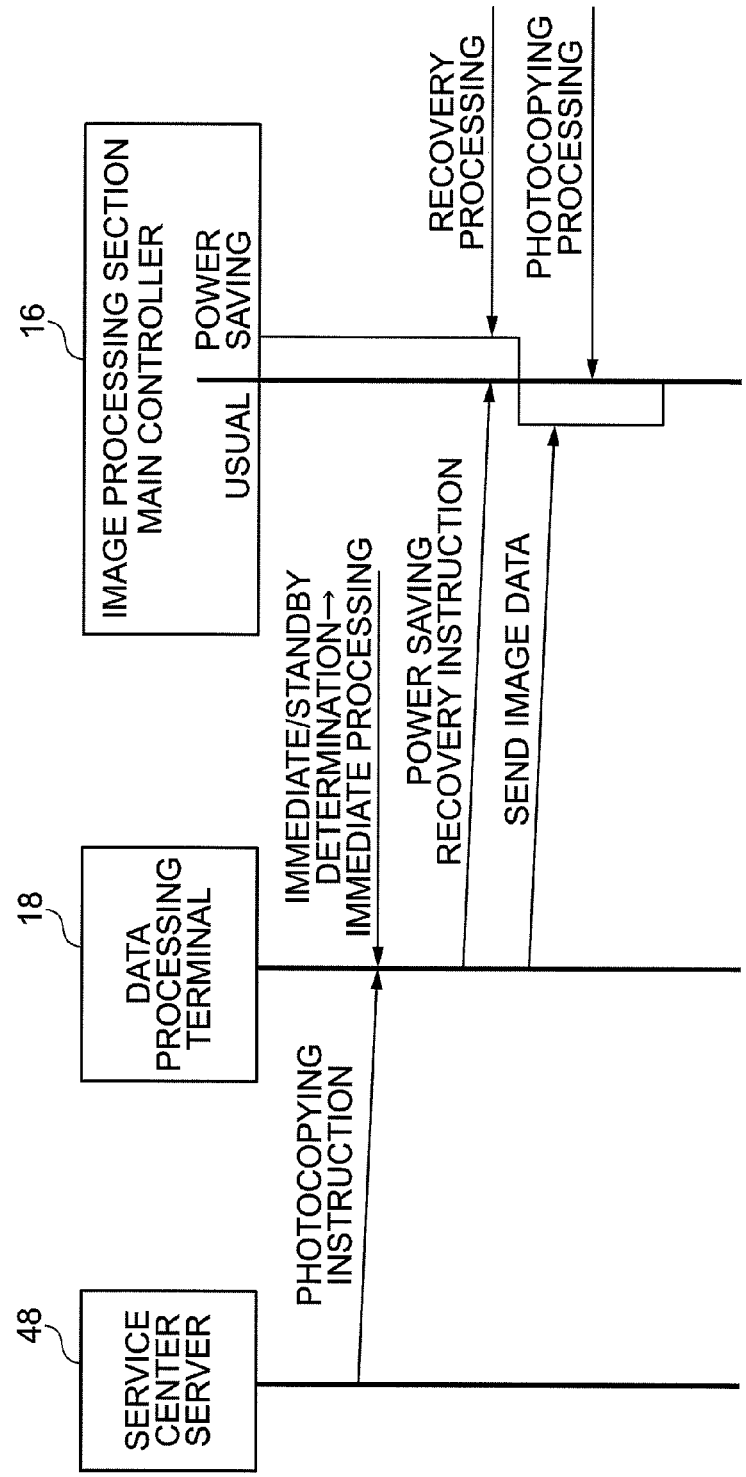
FIG. 6 is processing (a second example) that is executed between the service center server, the data processing terminal and the main controller, which are structures of the present exemplary embodiment.

As illustrated in FIG. 6, the second example is processing when immediate processing is instructed during the power saving mode. The processing is described with the data processing terminal 18 being the main actor. Here, the description is given with a photocopying instruction being offered as an example of an immediate processing instruction and a settings change (update) instruction being offered as an example of a standby processing instruction.

First, the data processing terminal 18 receives a photocopying instruction from a user via the UI 42 of the data processing terminal 18.

Then the data processing terminal 18 judges whether the received content is an immediate processing instruction or a standby processing instruction. In this case, it is judged to be immediate processing, and a power saving recovery instruction is sent to the main controller 24 of the image processing control section 16.

The main controller 24 receives the recovery instruction and executes a power saving recovery from the power saving mode to the usual mode.

When the image forming device 10 is in the usual mode, data instructing the start of the photocopying processing is sent from the data processing terminal 18 to the main controller 24.

Hence, photocopying processing is executed (started) at the image forming device 10 (the user uses the image forming device 10 to perform photocopying).

Third Example

Figure 7:
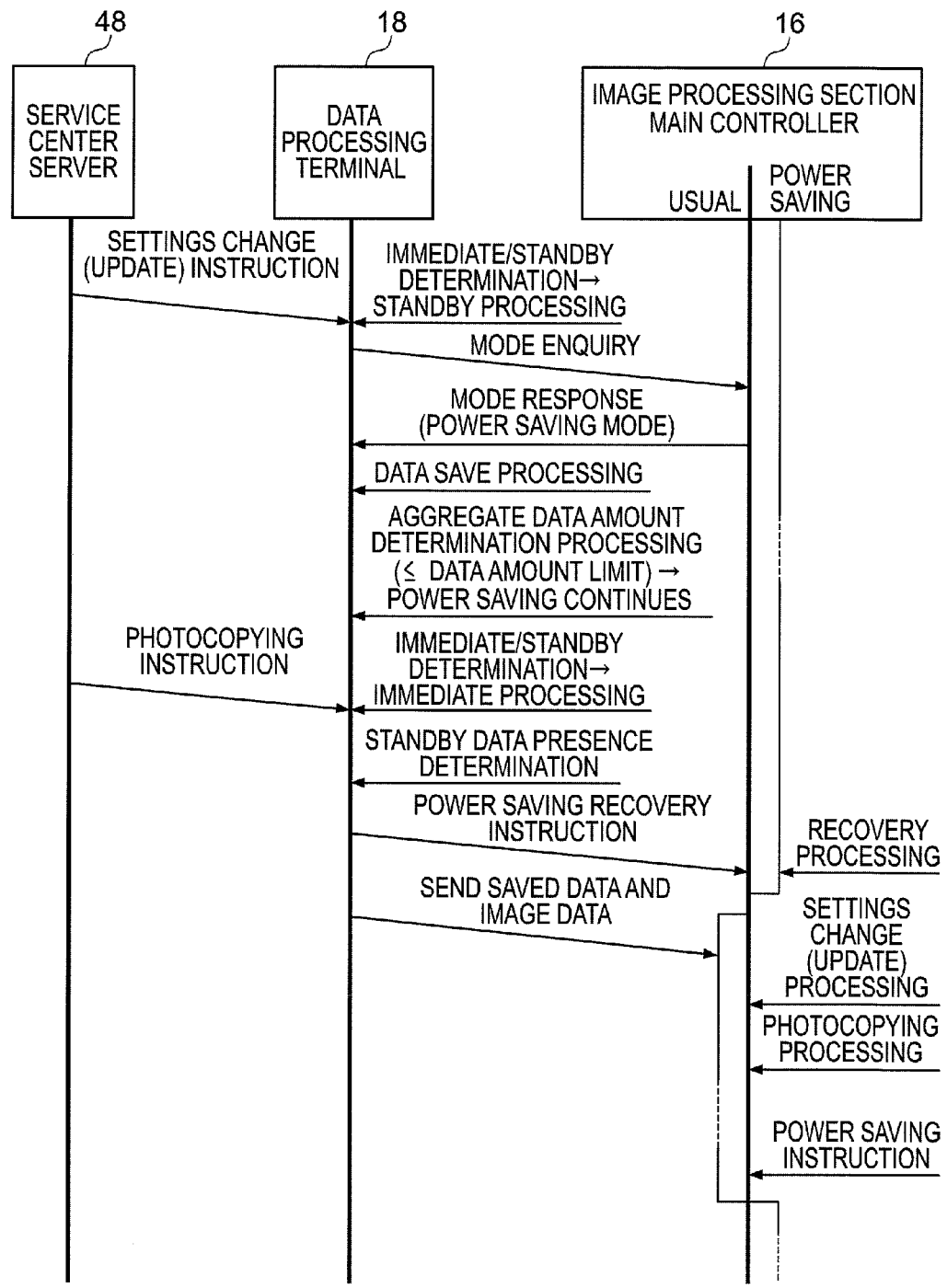
FIG. 7 is processing (a third example) that is executed between the service center server, the data processing terminal and the main controller, which is the structure of the present exemplary embodiment.

As illustrated in FIG. 7, the third example is processing when standby processing is instructed during the power saving mode and then immediate processing is instructed. The processing is described with the data processing terminal 18 being the main actor. Here, the description is given with a photocopying instruction being offered as an example of an immediate processing instruction and a settings change (update) instruction being offered as an example of a standby processing instruction.

First, the data processing terminal 18 receives a settings change (update) instruction from the service center server 48.

Then the data processing terminal 18 judges whether the received content is an immediate processing instruction or a standby processing instruction. In this case, it is judged to be standby processing, and a mode enquiry is sent to the main controller 24 of the image processing control section 16. Hence, a response from the main controller 24 is received.

In this case, the image forming device 10 is in the power saving mode. Therefore, processing is carried out to save settings change (update) data at the data processing terminal 18.

After the save, it is determined whether or not a processing data amount of the settings change (update) data that has been saved up to this time is less than the limit (less than the threshold value). In this case, it is equal to or less than the limit, and the power saving mode is continued.

Subsequently, the data processing terminal 18 receives the photocopying instruction.

Then the data processing terminal 18 judges whether the received content is for immediate processing or standby processing. In this case, it is judged to be immediate processing. After it has been determined whether or not there is saved settings change (update) data, a power saving recovery instruction is sent to the main controller 24 of the image processing control section 16.

The main controller 24 receives the recovery instruction and executes a power saving recovery from the power saving mode to the usual mode.

When the image forming device 10 is in the usual mode, the settings change (update) data that was saved is sent from the data processing terminal 18 to the main controller 24. Then data instructing the start of the photocopying processing is sent. Here, rather than sending a recovery instruction, the data processing terminal 18 may combine the data instructing the start of photocopying processing with the recovery instruction. That is, the image forming device 10 may be configured to switch from the power saving mode to the usual mode when the image forming device 10 receives data instructing the start of photocopying processing while in the power saving mode.

Hence, the settings change (update) processing and then the photocopying processing are executed at the image forming device 10.

Thereafter, if no processing is executed at the image forming device 10 for a certain duration, the image forming device 10 switches back to the power saving mode.

Fourth Example

Figure 8:
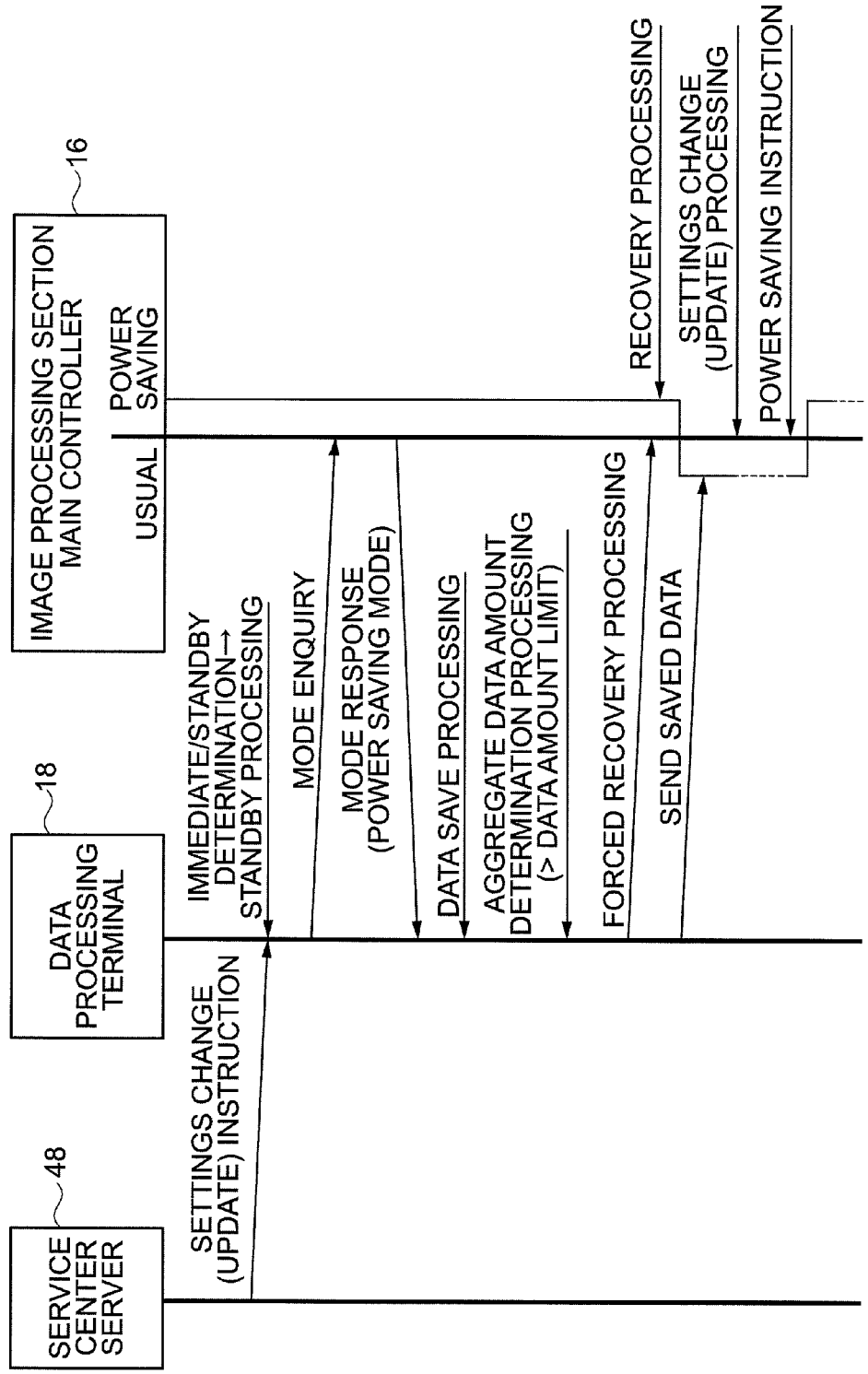
FIG. 8 is processing (a fourth example) that is executed between the service center server, the data processing terminal and the main controller, which is the structure of the present exemplary embodiment.

As illustrated in FIG. 8, the fourth example is processing when standby processing is successively instructed during the power saving mode. The processing is described with the data processing terminal 18 being the main actor. Here, the description is given with settings change (update) instructions being offered as examples of standby processing instructions.

First, the data processing terminal 18 receives a settings change (update) instruction from the service center server 48.

Then the data processing terminal 18 judges whether the received content is immediate processing or standby processing. In this case, it is judged to be standby processing, and a mode enquiry is sent to the main controller 24 of the image processing control section 16. Hence, a response from the main controller 24 is received.

In this case, the image forming device 10 is in the power saving mode. Therefore, processing is carried out to save settings change (update) data at the data processing terminal 18.

After the save, it is determined whether or not a processing data amount of the settings change (update) data that has been saved up to this time is less than the limit (less than the threshold value). In this case, it is judged to have exceeded the limit, and a power saving recovery instruction is sent to the main controller 24 of the image processing control section 16.

The main controller 24 receives the recovery instruction and executes a power saving recovery from the power saving mode to the usual mode.

When the image forming device 10 is in the usual mode, all of the settings change (update) data that has been saved is sent from the data processing terminal 18 to the main controller 24.

Hence, the plural settings change (update) processes are executed at the image forming device 10.

Thereafter, if no processing is executed at the image forming device 10 for a certain duration, the image forming device 10 switches back to the power saving mode.

Fifth Example

Figure 9:
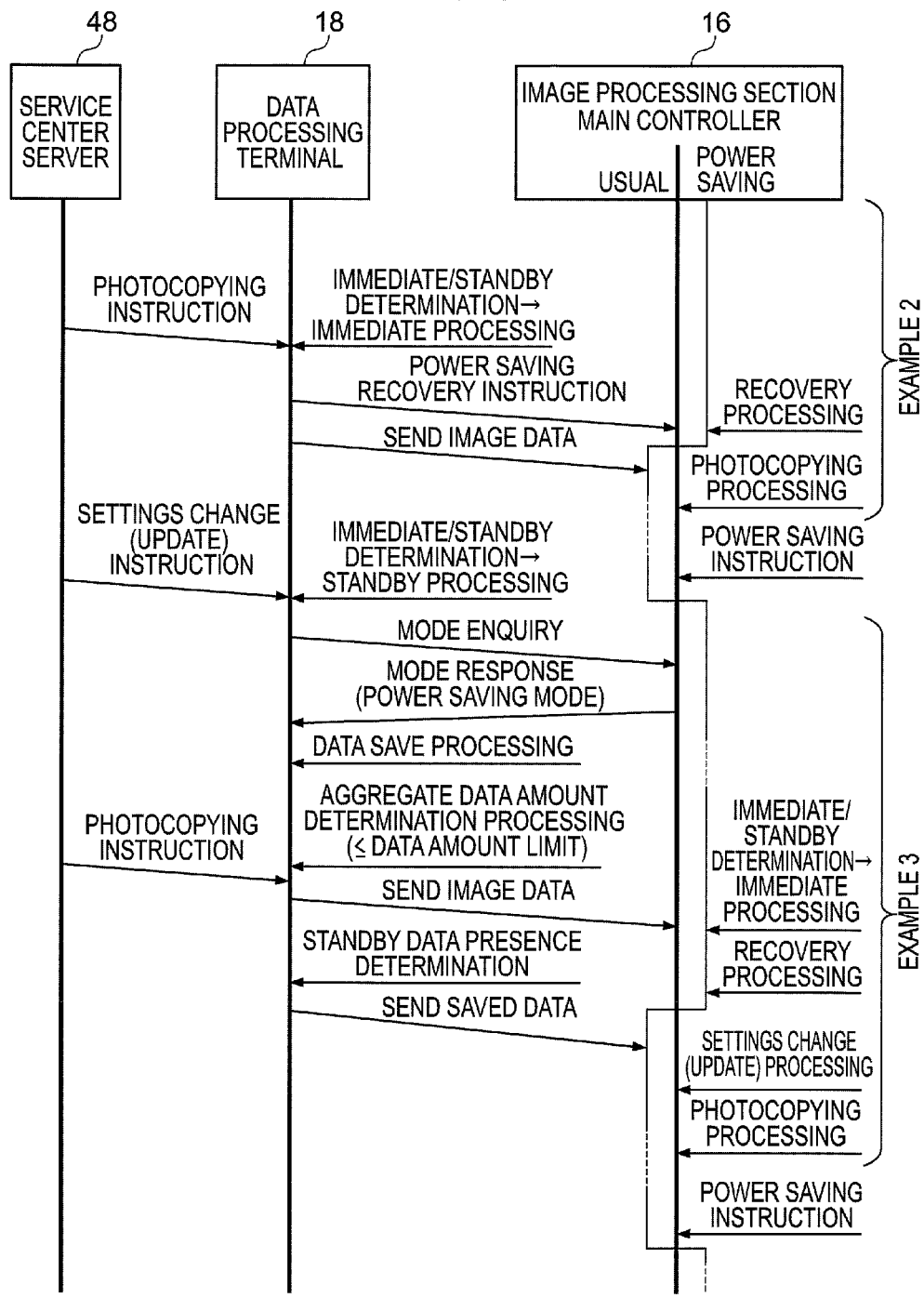
FIG. 9 is processing (a fifth example) that is executed between the service center server, the data processing terminal and the main controller, which is the structure of the present exemplary embodiment.

As illustrated in FIG. 9, the fifth example is combined processing selected from the first to fourth examples, and illustrates a case of successively executing the second example (FIG. 6) and the third example (FIG. 7). Here, because the communications sequence is the sequence of the second example, followed by temporarily switching into the power saving mode, and then the execution of the third example, detailed sequences are not described.

Sixth Example

Figure 10:
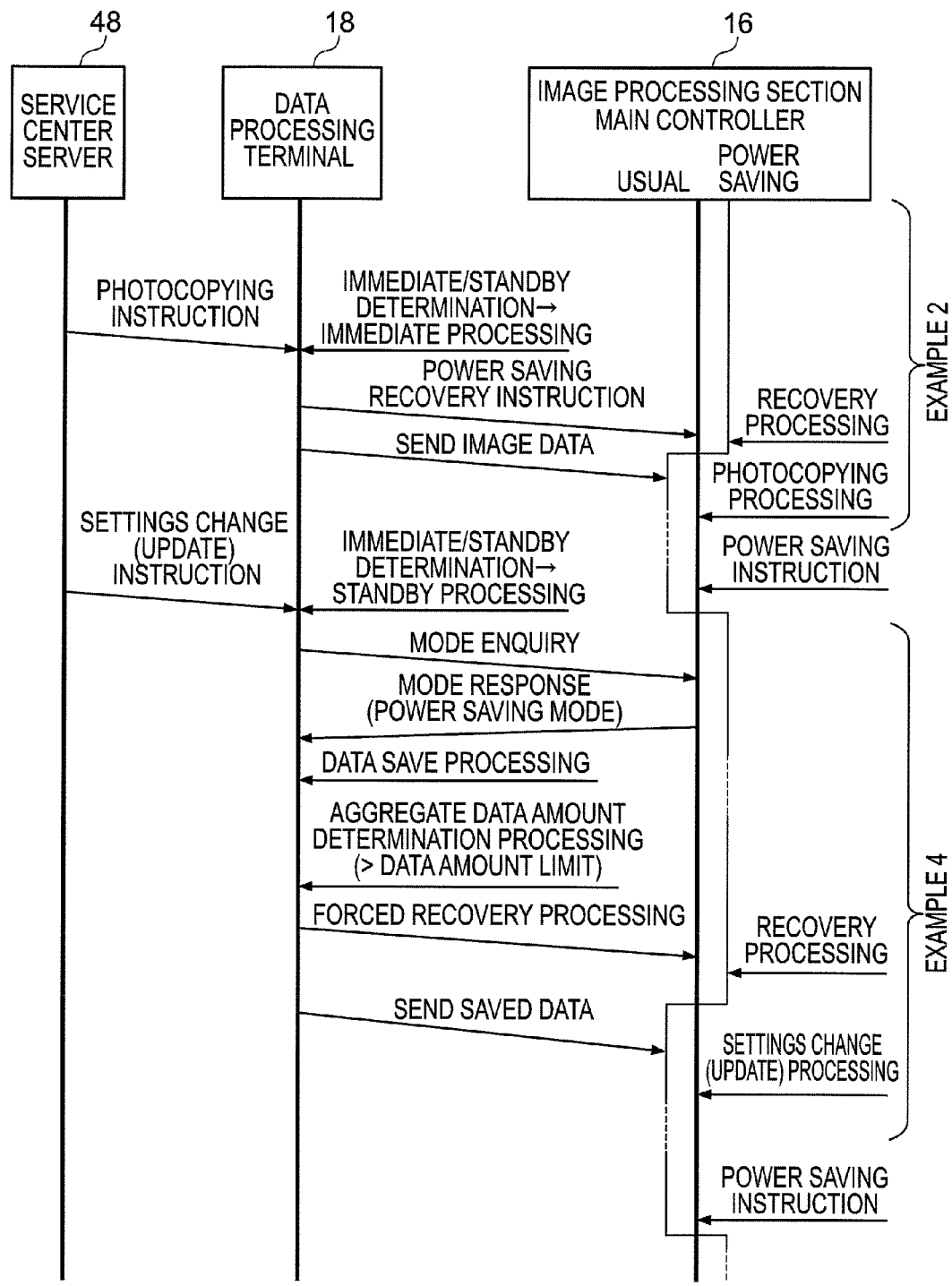
FIG. 10 is processing (a sixth example) that is executed between the service center server, the data processing terminal and the main controller, which is the structure of the present exemplary embodiment.

As illustrated in FIG. 10, the sixth example is combined processing selected from the first to fourth examples, and illustrates a case of successively executing the second example (FIG. 6) and the fourth example (FIG. 8). Here, because the communications sequence is the sequence of the second example, followed by temporarily switching into the power saving mode, and then the execution of the fourth example, detailed sequences are not described.

Seventh Example

Figure 11:
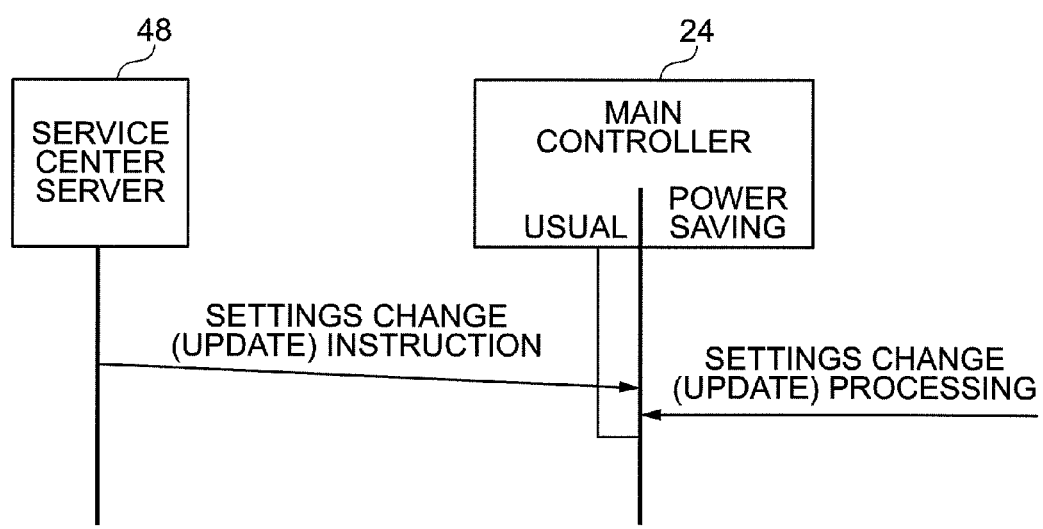
FIG. 11 is processing (a seventh example) that is executed between the service center server and the main controller, which is a structure of a variant example of the present exemplary embodiment.

As illustrated in FIG. 11, the seventh example is processing when standby processing is instructed during the usual mode. Here, the description is given with a photocopying instruction being offered as an example of an immediate processing instruction and a settings change (update) instruction being offered as an example of a standby processing instruction.

First, the main controller 24 of the image forming device 10 receives a settings change (update) instruction from the service center server 48.

In this case, the image forming device 10 is in the usual mode. Therefore, settings change (update) data is sent to the main controller 24.

Hence, the settings change (update) processing is executed at the image forming device 10.

Eighth Example

Figure 12:
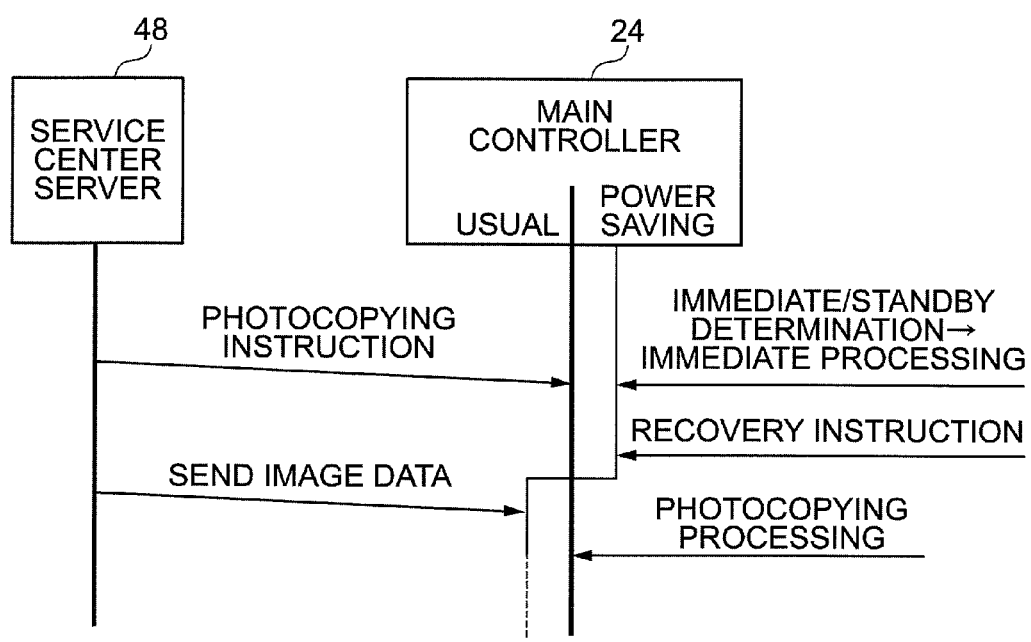
FIG. 12 is processing (an eighth example) that is executed between the service center server and the main controller, which is the structure of the variant example of the present exemplary embodiment.

As illustrated in FIG. 12, the eighth example is processing when immediate processing is instructed during the power saving mode. Here, the description is given with a photocopying instruction being offered as an example of an immediate processing instruction and a settings change (update) instruction being offered as an example of a standby processing instruction.

First, the main controller 24 of the image forming device 10 receives a photocopying instruction from a user via the UI 30.

Then the main controller 24 of the image forming device 10 judges whether the received content is immediate processing or standby processing. In this case, it is judged to be immediate processing, and power saving recovery is executed.

When the image forming device 10 is in the usual mode, image data is sent. Hence, photocopying processing is executed at the image forming device 10.

Ninth Example

As illustrated in FIG. 13, the ninth example is processing when standby processing is instructed during the power saving mode and then immediate processing is instructed. Here, the description is given with a photocopying instruction being offered as an example of an immediate processing instruction and a settings change (update) instruction being offered as an example of a standby processing instruction.

First, the main controller 24 of the image forming device 10 receives a settings change (update) instruction from the service center server 48.

Then the main controller 24 of the image forming device 10 judges whether the received content is immediate processing or standby processing. In this case, it is judged to be standby processing and, because the image forming device 10 is in the power saving mode, processing is carried out to save settings change (update) data at the image forming device 10.

After the save, it is determined whether or not a processing data amount of the settings change (update) data that has been saved up to this time is less than the limit (less than the threshold value). In this case, it is equal to or less than the limit, and the power saving mode is continued.

Subsequently, the main controller 24 of the image forming device 10 receives the photocopying instruction.

Then the main controller 24 of the image forming device 10 executes a power saving recovery.

When the image forming device 10 is in the usual mode, the settings change (update) processing that was saved and then the photocopying processing are executed.

Thereafter, if no processing is executed at the image forming device 10 for a certain duration, the image forming device 10 switches back to the power saving mode.

Tenth Example

As illustrated in FIG. 14, the tenth example is processing when standby processing is successively instructed during the power saving mode. Here, the description is given with settings change (update) instructions being offered as examples of standby processing instructions.

First, the main controller 24 of the image forming device 10 receives a settings change (update) instruction from the service center server 48.

Then the main controller 24 of the image forming device 10 judges whether the received content is for immediate processing or standby processing. In this case, it is judged to be standby processing and, because the image forming device 10 is in the power saving mode, processing is carried out to save settings change (update) data at the image forming device 10.

After the save, it is determined whether or not a processing data amount of the settings change (update) data that has been saved up to this time is less than the limit (less than the threshold value). In this case, it is judged to have exceeded the limit, and the main controller 24 of the image processing control section 16 executes power saving recovery.

When the image forming device 10 is in the usual mode, all of the settings change (update) data that has been saved is executed.

Thereafter, if no processing is executed at the image forming device 10 for a certain duration, the image forming device 10 switches back to the power saving mode.

Eleventh Example

As illustrated in FIG. 15, the eleventh example is combined processing selected from the seventh to tenth examples, and illustrates a case of successively executing the eighth example (FIG. 12) and the ninth example (FIG. 13). Here, because the communications sequence is the sequence of the eighth example, followed by temporarily switching into the power saving mode, and then the execution of the ninth example, detailed sequences are not described.

Twelfth Example

As illustrated in FIG. 16, the twelfth example is combined processing selected from the seventh to tenth examples, and illustrates a case of successively executing the eighth example (FIG. 12) and the tenth example (FIG. 14). Here, because the communications sequence is the sequence of the eighth example, followed by temporarily switching into the power saving mode, and then the execution of the tenth example, detailed sequences are not described.

What is claimed is:

1. A data processing device comprising:
   a reception unit that receives instructions for processing at a processing execution device;
   an instruction unit that instructs the processing execution device to cancel a power saving state of the processing execution device and execute processing corresponding to an instruction received by the reception unit; and
   a storage unit that stores data relating to the received instruction, wherein,
   if the processing corresponding to the received instruction is pre-specified processing, data relating to the received instruction is stored at the storage unit, and
   if the processing corresponding to the received instruction is not the pre-specified processing, the instruction unit instructs the processing execution device to execute the processing corresponding to the received instruction and also processing based on data relating to instructions stored at the storage unit,
   wherein processing that is judged not to be the pre-specified processing is processing that requires the intervention of a user, and,
   when a processing data amount of the data relating to instructions stored at the storage unit exceeds a pre-specified value, the instruction unit instructs execution of processing based on the data relating to instructions stored in the storage unit.

2. The data processing device according to claim 1, further comprising a judgment unit that judges whether or not the processing execution device is in the power saving state,
   wherein, if the processing execution device is not in the power saving state, then even if the processing corresponding to the received instruction is the pre-specified processing, the instruction unit instructs the processing execution device to execute the processing corresponding to the received instruction.

3. A data processing device comprising:
   a reception unit that receives instructions for processing;
   an execution unit that cancels a power saving state and executes processing corresponding to an instruction received by the reception unit; and
   a storage unit that stores data relating to the received instruction, wherein,
   if the processing corresponding to the received instruction is pre-specified processing data relating to the received instruction is stored at the storage unit, and
   if the processing corresponding to the received instruction is not the pre-specified processing, the execution unit executes the processing corresponding to the received instruction and also processing based on data relating to instructions stored at the storage unit,
   wherein processing that is judged not to be the pre-specified processing is processing that requires the intervention of a user, and,
   when a processing data amount of the data relating to instructions stored at the storage unit exceeds a pre-specified value, the instruction unit instructs execution of processing based on the data relating to instructions stored in the storage unit.

4. A non-transitory computer readable medium storing a program causing a computer to execute data processing that gives instructions to a processing execution device, the data processing comprising:
   receiving instructions for processing at the processing execution device;
   instructing the processing execution device to cancel a power saving state of the processing execution device and execute processing corresponding to a received instruction;
   if the processing corresponding to the received instruction is pre-specified processing, storing data relating to the received instruction at a storage unit; and
   if the processing corresponding to the received instruction is not the pre-specified processing, instructing the processing execution device to execute the processing corresponding to the received instruction and also processing based on data relating to instructions stored at the storage unit,
   wherein processing that is judged not to be the pre-specified processing is processing that requires the intervention of a user, and,
   when a processing data amount of the data relating to instructions stored at the storage unit exceeds a pre-specified value, the instruction unit instructs execution of processing based on the data relating to instructions stored in the storage unit.

* * * * *